United States Patent Office 2,797,239
Patented June 25, 1957

2,797,239
PREPARATION OF CHLOROALKANESULFONATES

Charles H. Schramm, Hillsdale, and Cheves T. Walling, Upper Montclair, N. J., assignors to Lever Brothers Company, New York, N. Y., a corporation of Maine No Drawing. Application November 3, 1953, Serial No. 390,092

6 Claims. (Cl. 260—513)

The present invention relates to a process for the preparation of chloroalkanesulfonates which comprises reacting an alkylene chlorobromide with a water-soluble metallic sulfite.

The reaction of ethylene dibromide and sodium sulfite to produce sodium beta-bromoethanesulfonate has been described by Marvel and Sparberg, Organic Syntheses, collective volume II, pages 558 and 559. This reaction is reasonably fast, and it is possible to obtain thereby a sixty-five to seventy percent yield of sodium beta-bromoethanesulfonate in a reaction time of about four hours. The reaction, however, has one great disadvantage, i. e., it is necessary to employ a large excess of ethylene dibromide in order to prevent the formation of large amounts of sodium ethanedisulfonate. Recommended molar ratios of ethylene dibromide to sodium sulfite in the reaction are generally in excess of three to one and the optimum ratio is approximately 3.27 mols of ethylene dibromide to each mol of sodium sulfite. This great excess of ethylene dibromide results in a very low reactor efficiency, i. e., a great volume of reactants must be processed in order to obtain a relatively small yield of product. Furthermore, it is necessary to recover the excess unreacted ethylene dibromide at the end of the reaction and the great quantity of ethylene dibromide to be recovered adds considerably to the cost and inconvenience of the process.

The reaction of ethylene dichloride and an alkali metal sulfite has also been reported in the literature and a description of this reaction may be found, for example, in U. S. Patent No. 1,888,794 to Ernst et al. This reaction, however, is extremely slow and it is necessary to employ potassium sulfite as a reactant if reasonable yields of beta-chloroethanesulfonate are to be obtained. Even then it is necessary to employ a very high ratio of ethylene dichloride to potassium sulfite in order to obtain yields in the vicinity of sixty to seventy percent of potassium beta-chloroethanesulfonate and to depress the formation of potassium ethanedisulfonate.

In view of the disadvantages of the two prior art reactions hereinabove described, it is an object of the present invention to provide a process for the preparation of chloroalkanesulfonates which is capable of providing high yields of these compounds without the necessity of employing a high ratio of alkylene dihalide to metallic sulfite.

The present invention is based on the discovery that an alkylene chlorobromide will react very readily with a water-soluble metallic sulfite to give high yields of a chloroalkanesulfonate without the necessity of employing the large excess of alkylene dihalide which is required in the corresponding prior art reactions hereinabove described. The process of the present invention accordingly comprises reacting an alkylene chlorobromide with a water-soluble metallic sulfite to produce a chloroalkanesulfonate as represented by the following equation:

$$ClC_nH_{2n}Br + SO_3 \longrightarrow ClC_nH_{2n}SO_3 + Br$$

wherein $n$ represents a small whole number between 1 and 5, preferably 2.

Any water-soluble sulfite can be employed in the reaction. Because of economic factors, the alkali metal sulfites such as sodium or potassium sulfite are generally employed. However, other water-soluble metallic sulfites such as magnesium sulfite and zinc sulfite can also be employed. In addition, the water-soluble metal metabisulfites, such as sodium metabisulfite can be employed, although when using a metabisulfite, it is necessary to add a mol of a metal hydroxide, such as sodium hydroxide, for each mol of metabisulfite which converts the metabisulfite in situ to the sulfite.

The alkylene chlorobromides which can be employed as reactants include ethylene chlorobromide and normal and branched chain propylene chlorobromides, butylene chlorobromides and amylene chlorobromides in which the chlorine and bromine atoms are attached to different carbon atoms. Methylene chlorobromide can also be employed.

The reaction is preferably performed by allowing the two components in a dissolved or suspended state to react together. While the reaction will take place slowly at room temperature, it is preferred to heat the reaction mixture since, in accordance with the general laws of chemistry, the reaction is accelerated by heat. Temperatures of from about 78° C. to about 95° C. are generally preferred when operating in aqueous medium but even higher temperatures, attained by the employment of super-atmospheric pressure, can be employed.

The preferred medium for the reaction is an aqueous solution of a lower alkanol such as, for instance, methanol or ethanol, although water alone can be used.

It has been found that the reaction of the present invention will take place rapidly and result in a good yield even when the molar ratio of alkylene chlorobromide to metallic sulfite is as low as about 1.5 to 1 and that even with this low ratio only a negligible amount of alkane disulfonate is formed. However, even lower ratios, such as 1.1 to 1, can be employed and fair yields can be obtained.

Higher molar ratios up to about 3.5 to 1 of alkylene chlorobromide to metallic sulfite can be employed, however, and slight increases in yield can be obtained thereby, but it is generally preferred to employ a lower ratio because of the considerations mentioned hereinabove. A recommended molar ratio is between 1.5 to 1 and 2.5 to 1. In contrast, the prior art reactions generally require a molar ratio of alkylene dihalide to metallic sulfite of about 3.27 to 1 in order to suppress the formation of large quantities of alkane disulfonate. From these facts it can be seen that a much greater reactor efficiency is achieved in the present invention and that there is less unreacted material to be recovered.

In a typical reaction according to the present invention, the reactants, i. e., alkylene chlorobromide and a metallic sulfite are suspended in aqueous alcohol. Thereafter the reaction mixture is heated to the reflux temperature and allowed to remain at that temperature for a few hours until analysis reveals the exhaustion of sulfite ions. The excess unreacted alkylene chlorobromide and alcohol are then recovered by distillation leaving in the reaction vessel an aqueous solution of a chloroalkanesulfonate. If desired, a dry chloroalkanesulfonate can be recovered from the aqueous solution by evaporation of the water.

In the following examples the process is described using ethylene chlorobromide as illustrative of the best mode of carrying out the invention of the scope heretofore defined in order to permit a comparison of the variables which affect the process.

Example 1

Into a reaction vessel equipped with a stirrer and a reflux condenser there was placed a mixture of 1879 g. of ethylene chlorobromide (13.1 mols), 5,000 ml. of 95% alcohol, and 1030 g. (8.16 mols) of sodium sulfite dissolved in 7,000 ml. of water. The reaction mixture was then refluxed for eighteen hours until a clear solution was obtained. The solution was then distilled to recover the alcohol and the excess ethylene chlorobromide and there remained 6,033 g. of an aqueous solution of sodium beta-chloroethanesulfonate. Analysis of the solution indicated the presence of 7.27 mols of the product which represents a yield equal to 89.1% of the theoretical yield. In this example the ratio of ethylene chlorobromide to sodium sulfite was only 1.60 to 1.

Example 2

The procedure of Example 1 was followed except that the amount of 95% ethyl alcohol was increased to 10,000 ml. and the amount of water was increased to 12,600 ml. The reaction mixture was refluxed for eleven hours and an aqueous solution of sodium beta-chloroethanesulfonate was recovered as in the preceding example. The total yield was 83.7% of the theoretical yield.

Example 3

The procedure of Example 1 was followed except that the amount of ethylene chlorobromide was doubled to provide a molar ratio of ethylene chlorobromide to sodium sulfite of 3.27 to 1. The reaction mixture was refluxed for four hours and an aqueous solution of sodium beta-chloroethanesulfonate was recovered as before. In this example, the yield was determined as 90.7% of the theoretical yield.

Example 3A

The procedure of Example 3 was followed except that an equivalent quantity of ethylene dichloride was substituted for the ethylene chlorobromide of the preceding example. The reaction mixture was refluxed for twenty-eight hours and after distillation of the unreacted ethylene dichloride and ethanol, the yield of sodium beta-chloroethanesulfonate amounted to only 42% of the theoretical yield.

Example 3B

The procedure of Example 3A was followed except that an equivalent molar quantity of potassium sulfite was substituted for the sodium sulfite. The reaction mixture was refluxed for twenty hours and an aqueous solution of potassium beta-chloroethanesulfonate was recovered as before. Despite the fact that potassium sulfite gives a faster reaction than sodium sulfite, the yield of product was still only 64.3% of the theoretical yield as contrasted to the 90.7% yield obtained in Example 3.

Example 4

The procedure of Example 1 was followed except that potassium sulfite was substituted for sodium sulfite and the reflux time was shortened from eighteen hours to three and one-half hours. The yield of potassium beta-chloroethanesulfonate was 84.6% of the theoretical yield.

Example 5

Into a reaction vessel equipped with a stirrer and reflux condenser there was placed a mixture of 1,260 g. (8.8 mols) of ethylene chlorobromide, 1,600 ml. of 95% ethyl alcohol and 1,030 g. (8.16 mols) of sodium sulfite and 2,190 ml. of water, the mixture containing ethylene chlorobromide and sodium sulfite in a molar ratio of about 1.1 to 1. The mixture was then refluxed for two and one-half hours and an aqueous solution of sodium beta-chloroethanesulfonate was recovered as in Example 1. The yield was 61.6% of the theoretical yield.

Example 6

Into a reaction vessel equipped with a stirrer and reflux condenser there was placed a mixture of 1,170 g. (8.16 mols) of ethylene chlorobromide, 1,030 g. of sodium sulfite (8.16 mols) and 5,600 ml. of water. The mixture was then refluxed for five hours. The yield of sodium beta-chloroethanesulfonate was 16.5% of the theoretical yield.

Example 7

A reaction vessel equipped with a stirrer and reflux condenser was charged with 80,500 g. of a sodium sulfite solution containing 127 mols of sulfite. From a previous preparation, there had been collected a distillate containing 18,300 g. of water, 56,500 g. of 95% ethyl alcohol and 48,030 g. of ethylene chlorobromide. The distillate was added to the reaction vessel and an additional 4,200 g. of 95% ethanol and 21,000 g. of ethylene chlorobromide were added. This brought the total ethylene chlorobromide content to 181 mols, providing a molar ratio of chlorobromide to sulfite of 1.43 to 1.

The reactor was then closed, and the contents were heated with stirring at 90° C. to 95° C. for four hours, the pressure in the vessel varying from 10 to 15 pounds per square inch. At the end of this time the solution was clear and all of the sulfite had reacted. The alcohol and excess ethylene chlorobromide were then distilled off under vacuum until 75,500 g. of concentrate remained. The concentrate contained 104.56 mols of sodium beta-chloroethanesulfonate representing a yield of 82.4% of the theoretical.

Example 8

The procedure of Example 7 was followed except that the number of mols of sodium sulfite was reduced to 117 providing a molar ratio of chlorobromide to sulfite of about 1.55 to 1 and the reaction was carried out at atmospheric reflux temperature instead of under pressure. The mixture was refluxed for a total of eighteen hours and the unreacted chlorobromide and alcohol were distilled off as in the preceding example. The yield in this instance was 92.4% of the theoretical yield.

Example 8A

The precedure of Example 8 was followed in preparing sodium beta-bromoethanesulfonate from the reaction of ethylene dibromide and sodium sulfite and employing a molar ratio of dibromide to sulfite of 3.27 to 1. Despite the fact that a higher molar ratio was employed in this example, the yield of product was nevertheless lower than the yield in Example 8, amounting to only 78.6% of the theoretical yield.

Example 9

Into a reaction vessel equipped with a reflux condenser there was placed a solution of 100 g. (0.64 mol) of 1-bromo-3-chloropropane in 400 ml. of ethyl alcohol and 300 ml. of water. Forty-eight (48) g. (0.38 mol) of sodium sulfite was added and the contents of the vessel was refluxed for two and one-half hours. The resultant solution was then distilled under vacuum to remove the solvents. This yielded two crops of crystals totaling 62 g. which contained 6 g. of sodium bromide. The yield in the reaction was 82%.

From the foregoing examples, it is evident that the present invention provides a process which is generally superior to the prior art processes.

It is intended to cover all changes and modifications in the examples of this invention, herein given for the purposes of disclosure, which do not constitute departure from the spirit and scope of the appended claims.

We claim:

1. A process for the preparation of a chloroalkanesulfonate which comprises reacting an alkylene chlorobromide having from 1 to 5 carbon atoms with a water-soluble metallic sulfite.

2. A process according to claim 1 in which the metallic sulfite is an alkali metal sulfite.

3. A process according to claim 1 in which the reaction is performed in a medium comprising an aqueous alcohol.

4. A process according to claim 2 in which the metallic sulfite is sodium sulfite.

5. A process according to claim 1 in which the reaction is performed in aqueous alcohol at a temperature of from about 78° C. to about 95° C.

6. A process according to claim 1 in which the alkylene chlorobromide is ethylene chlorobromide.

References Cited in the file of this patent
UNITED STATES PATENTS 1,888,794   Ernst et al. _____ Nov. 22, 1932

OTHER REFERENCES

James: J. C. S. (London), vol. 47, 365–6 (1885).
Slator: J. C. S. (London), vol. 85, 1300–1 (1904).